April 16, 1968     P. E. THOMAS     3,377,746
RECIPROCATING GATE CONTROL
Filed Feb. 14, 1966     2 Sheets-Sheet 1
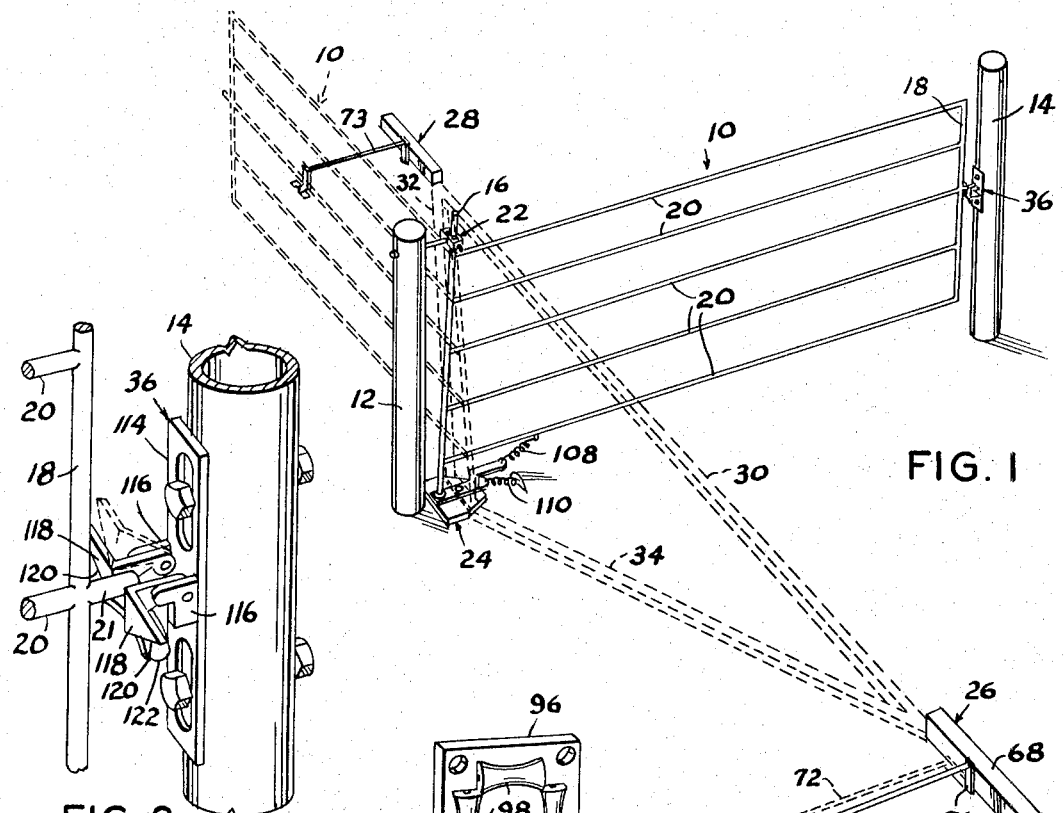
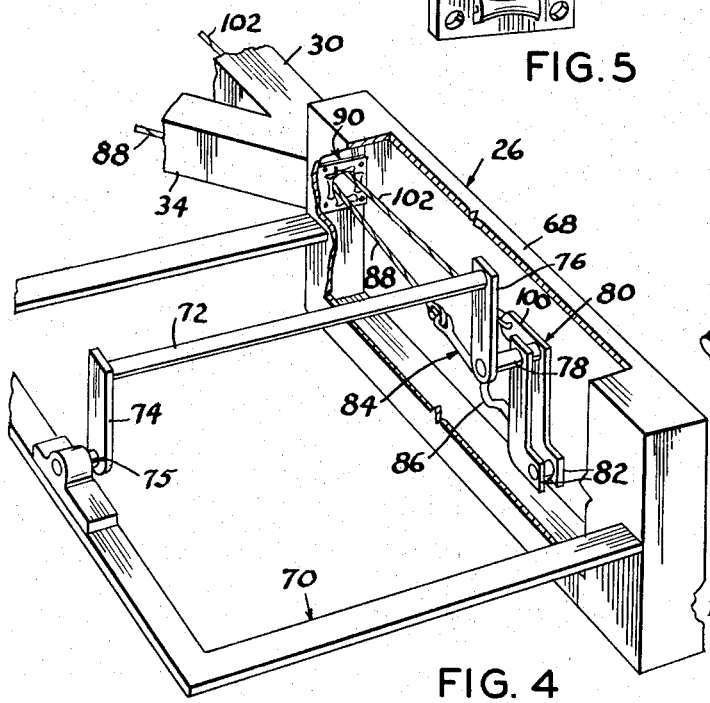
PAUL E. THOMAS
*INVENTOR.*
BY
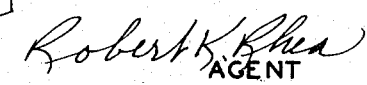
AGENT April 16, 1968 P. E. THOMAS 3,377,746
RECIPROCATING GATE CONTROL
Filed Feb. 14, 1966 2 Sheets-Sheet 2
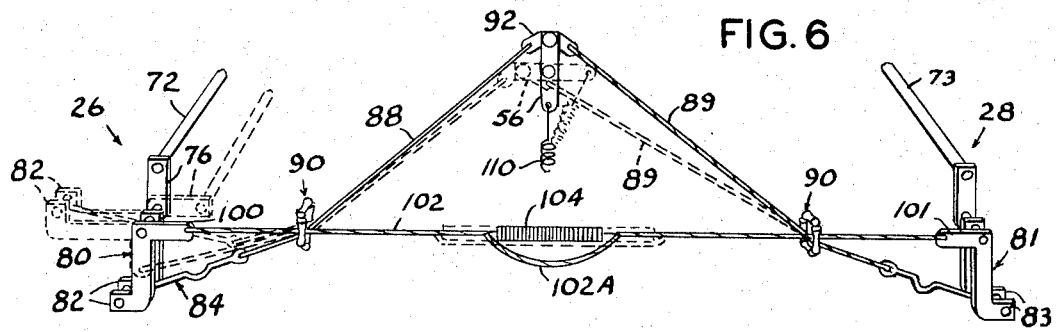
FIG. 6
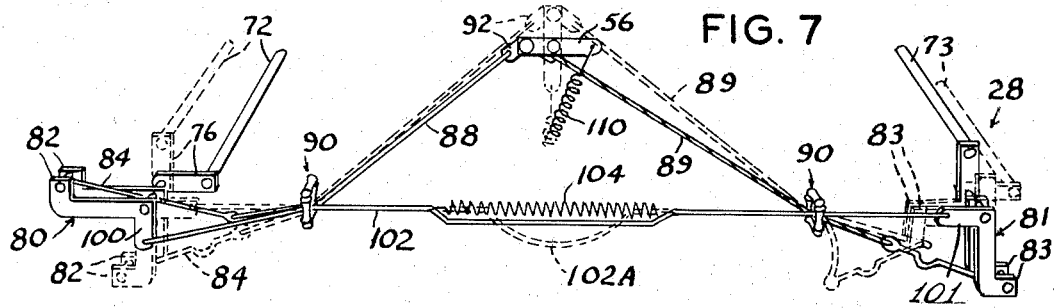
FIG. 7
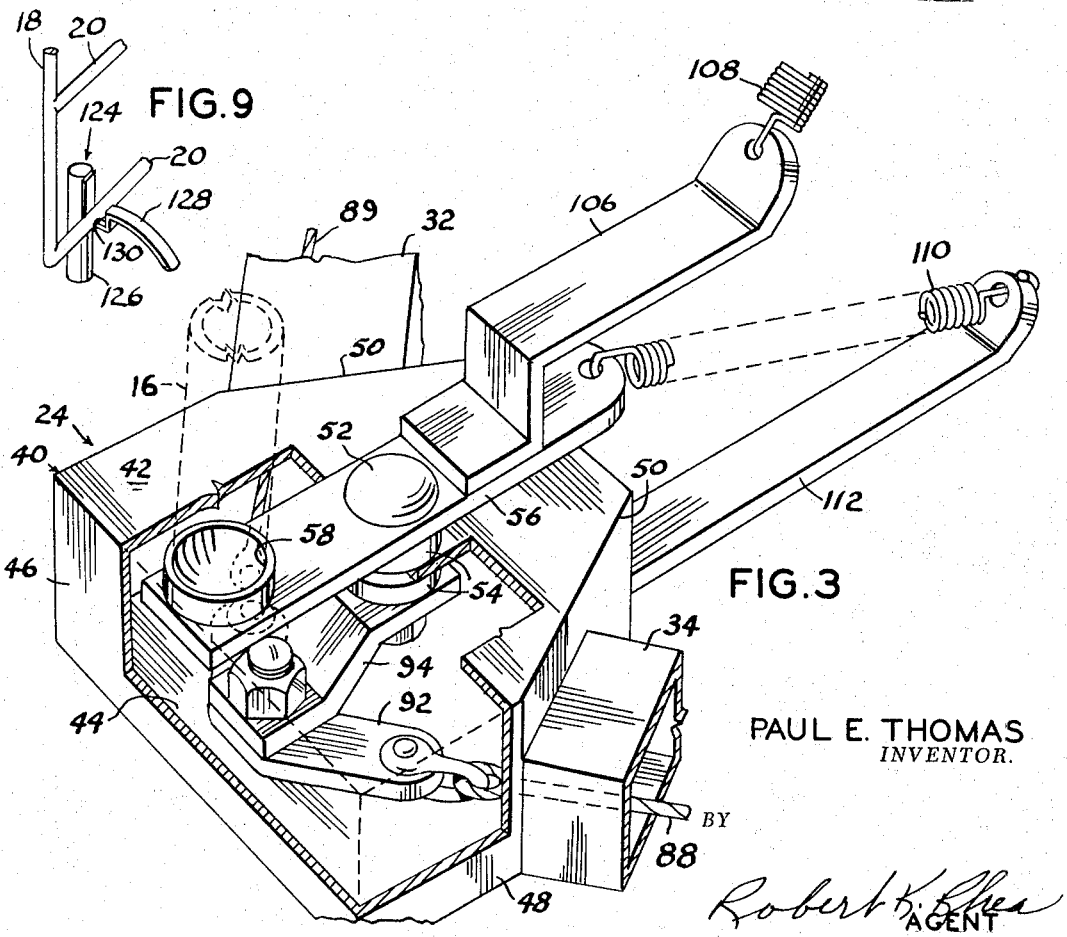
FIG. 9
FIG. 3
PAUL E. THOMAS
INVENTOR.
BY
Robert K. Shea
AGENT 3,377,746
RECIPROCATING GATE CONTROL
Paul E. Thomas, Box 37, Alma, Okla. 73003
Filed Feb. 14, 1966, Ser. No. 527,283
4 Claims. (Cl. 49—242)

ABSTRACT OF THE DISCLOSURE

A control housing having a control arm mounted thereon, for horizontal pivoting movement about a vertical axis, is placed close to a gate post and aligned with the upper gate hinge axis of the gate. The control arm is provided with a socket vertically off-set from the upper hinge axis for pivotally supporting the hinged end of the gate on an inclined axis. Bar means, mounted in the roadway in parallel spaced relation above the surface of the roadway and on opposing sides of the gate, are pivoted toward and away from the surface of the roadway by the passage of a vehicle. A bell crank, connected to the end of the respective bar means, is connected by a cable to the control arm for moving the control arm and the inclined gate supporting axis in a gate opening and closing action, respectively, by the passage of a vehicle.

---

The present invention relates to gates and more particularly to an improvement in a vehicle operated automatic gate opening and closing mechanism.

The prior art discloses various types of automatic operating gate mechanisms. The more popular type of automatic gate is electrically operated. The electric type is usually expensive to make and maintain and is subject to wiring defects or power failure. The mechanical automatic gates generally require the use of trigger springs or weights to effect the opening and closing action and because of various mechanical defects are not generally in use.

It is, therefore, the principal object of this invention to provide a vehicle operated mechanism for opening and closing a horizontally swinging gate wherein gravitational attraction for the gate, when unbalanced, is employed to achieve both the opening and closing movement.

Another object is to provide a gate control means wherein the gate returns to a closed position and is secured by a latching means connected with one gate post.

Another object is to provide gate control means wherein an approaching vehicle moves the gate to an opened position, preferably away from the vehicle, and subsequently moves the gate toward a closed position after passing.

Still another object is to provide a gate control means which pivots the gate toward an open position away from an approaching vehicle.

A further object is to provide a gate control means which will operate a single gate or a double gate and wherin the gate or gates may be tripped to swing in only one direction for opening.

Still another object is to provide a device of this class which does not hamper manual opening and closing of the gate.

Summary of the invention

This invention is used in combination with a gate extending between a pair of gate posts and comprises an upper hinge means pivotally supporting the gate at the upper limit of one of its ends and a lower hinge means having a control arm mounted on a control housing for pivotally supporting the lower end portion of the gate on an inclined axis. A vehicle operated bar is mounted in the roadway parallel with and on opposing sides of the gate for pivoting movement toward and away from the surface of the roadway by the passage of vehicle wheels. A bell crank, connected to each end of the bar means and connected with the control arm by cables, rotates the control arm to change the position of the inclined gate supporting axis for opening and closing the gate by the passage of vehicle wheels over the bar means.

Other objects will be apparent from the following description when taken in conjunction with the accompanying two sheets of drawings, wherein:

FIGURE 1 is a perspective view of a gate having the mechanism connected therewith and illustrating, by dotted lines, the gate when opened in one direction;

FIGURE 2 is a fragmentary perspective view of the upper gate hinge means;

FIGURE 3 is a fragmentary perspective view, with parts broken away for clarity, of the lower gate hinge and control means;

FIGURE 4 is a fragmentary perspective view, with parts broken away for clarity, of one of the vehicle operated trigger means;

FIGURE 5 is a perspective view of a cable control bearing;

FIGURES 6 and 7 are fragmentary perspective views, partially in plan view, diagrammatically illustrating the operation of the vehicle operated trigger means and gate control arm;

FIGURE 8 is a fragmentary perspective view of the gate closed position latching means; and, FIGURE 9 is a fragmentary perspective view illustrating a gate open position retainer.

Like characters of reference designate like parts in those figures of the drawings in which they occur.

In the drawings:

The reference numeral 10 indicates a gate, as a whole, mounted between upright gate posts 12 and 14 defining a fence line. The gate post 12 will hereinafter be referred to as a sampson post and the gate post 14 will be referred to as a latching post. The gate 10 may be formed from any type of material as long as it is rigidly constructed and in the example shown it is formed from rod or tubular material and welded together. The gate includes an upright pivot post 16 at one end and an opposite latching end member 18 interconnected by a plurality of horizontal cross bars 20. The pivot post 16 projects upwardly and downwardly beyond the respective upper and lower horizontal cross bar 20. The upper end portion of the pivot post 16 is connected to the sampson post 12 by an upper hinge means 22 while the depending end of the pivot post 16 is supported by a lower hinge or control means 24. Vehicle operated trigger bar mechanisms or means 26 and 28 are mounted in the roadway on respective opposing sides of the gate and are interconnected with each other and the control means 24 through conduits 30, 32 and 34, in the manner more fully described hereinbelow.

A cam latching means 36, connected with the latching post 14, normally maintains the gate 10 in a closed and latched position in the manner hereinafter described.

The lower hinge or control means 24 comprises a hollow control housing 40 having a top wall 42 joined to a bottom or lower wall 44 by a vertical back wall 46 and side walls 48. A portion of the side walls 48 converge away from the back wall 46, as at 50. The housing 40 is preferably partially imbedded in the surface of the earth with the back wall 46 adjacent the sampson post 12. The back wall 46 may be connected with the sampson post 12, if desired. A hinge bolt 52 extends centrally through the top wall 42 of the housing with a pair of bearings 54 surrounding the bolt and respectively contacting the upper and depending surface of the top wall 42. A control arm 56, rectangular in cross section, surrounds and is rigidly connected intermediate its ends with the bolt 52 above the top-most bearing 54. One end portion of the control arm is provided with an upstanding socket 58 which nests the depending end portion of the gate pivot post 16. Thus the gate pivot post 16 is eccentrically supported, in off-set relation at its depending end, with respect to the vertical axis defined by the bolt 52 and the vertical axis of the upper hinge means 22.

The upper hinge means 22 may be of any type which will permit a rocking-like rotational movement of the gate pivot post 16 and by way of example an upwardly and downwardly open rectangular walled holder 60 is connected by a bolt 62 to the upper end portion of the sampson post 12. The opening in the walled housing 60 is substantially greater than the diameter of the pivot post 16 for loosely receiving pillow blocks 64 having arcuate surfaces contiguously contacting diametrically opposite sides of the pivot post 16. A set screw 66 extends through the respective opposing walls of the housing 60, laterally of the gate, in contact with the respective pillow block 64 thus permitting the rocking and rotational movement of the pivot post 16 and eccentric movement of its depending end portion. Thus it may be seen that when the control end arm 56 is parallel with respect to the vertical plane defined by the gate and fence, the depending end of the pivot post 16 is off-set toward the depending end of the sampson post 12 thus positioning the center of gravity of the gate in line with the plane of the fence. Movement of the control arm, in either direction, from its aligned position with the fence thus changes the center of gravity of the gate away from the respective direction of movement of the socket equipped end portion of the control arm to unbalance the gate. Gravitational attraction for the mass of the gate then rotates the latter toward an open position. Movement of the control arm 56 is accomplished by either one of the trigger bar mechanisms or means 26 and 28. The trigger means 26 and 28 are substantially mirror images of each other and in the interest of brevity only the trigger means 26 will be described in detail.

The trigger means 26 (FIG. 4) comprises a rectangular walled housing 68 having a horizontal laterally projecting frame 70 intermediate its vertical height. The frame 70 and that portion of the housing 68 below the plane of the frame is imbedded in the surface of the earth or roadway. The longitudinal axis of the housing 68 is positioned perpendicular with respect to the vertical plane of the gate 10, preferably at one side of the roadway, so that the wheels at one side of a vehicle, not shown, will pass over the frame 70 and operate the trigger means 26 in the manner hereinafter described.

A vehicle operated bar 72 is connected to the upper end portions of normally vertically disposed pivot arms 74 and 76. The depending end of the arm 74 is pivotally connected to the frame 70 by a frame pin 75 while the depending end of the pivot arm 76 is connected to a pivot pin 78 journaled by the adjacent wall of the trigger housing 68. Thus the trigger bar 72 may be pivoted toward the surface of the earth about the horizontal axis defined by the pivot pins 75 and 78. A bell crank 80 is secured, within the housing 68, to the inwardly projecting end of the pin 78. The bell crank 80 comprises a pair of parallel arm portions 82 normally depending from the pin 78 and turned at their depending end portions in right angular relation toward the end of the housing 68 opposite the conduits 30 and 34. A rod 84 is pivotally connected to the free end portions of the crank arms 82 and projects toward the conduits 30 and 34. The rod 84 is provided intermediate its ends with a bowed portion 86 for the purposes presently explained. The free end of the rod 84 is connected to a cable 88 which extends through an aperture in the housing 68 surrounded by a cable bearing means 90. The other end portion of the cable 88 extends longitudinally through the conduit 34 and is connected to one leg of a V-shaped wing member 92 pivotally connected, at its apex, to one end of an angular arm 94 in turn rigidly connected by its other end portion to the depending end portion of the pivot bolt 52.

The cable bearing 90 (FIG. 5) comprises a plate 96 secured to the end wall of the housing 68 connected with the conduits 30 and 34. The plate 96 is centrally apertured and the wall defining the aperture journals spool-like rollers 98 which act as pulleys to reduce the frictional contact of cables reciprocated through the opening formed thereby. The bell crank 80 includes a single normally horizontal arm portion 100 extending in right angular relation with respect to the bell crank arms 82 toward the conduit 30. A cable 102 is connected to the bell crank arm 100 and extends through the conduit 30 where it is connected at its other end portion to the bell crank arm 101 of the trigger means 28 (FIGS. 6 and 7).

The passage of a vehicle approaching the gate from the right, as viewed in FIG. 1, pivots the bar 72 of the trigger means 26 toward the gate, as shown by dotted lines. This pivots the bell crank arms 82 away from the gate and rotates the control arm 56, by means of the cable 88, so that the socket 58 is positioned toward the trigger means 26. Moving the depending end of the gate pivot post 16 toward the latching post 14 thus lifts the latched end of the gate out of contact with the latching means 36, placing the gate in an unbalanced condition wherein gravitational attraction for the gate swings it toward an open position away from the approaching vehicle and at least 90° with respect to its closed position, as shown by dotted lines (FIG. 1). This opening and the closing action of the gate will be more clearly understood by referring to FIGS. 6 and 7.

In FIG. 6 the solid line position of the components illustrate the gate in closed position with the bars 72 and 73 of the respective trigger means 26 and 28 in an upright gate closed position. Similarly the control arm 56 is aligned with the closed gate, not shown. When a vehicle pivots the bar 72 toward the gate, as previously described and as shown by dotted lines (FIG. 6), the bell crank 80, by means of the cable 88, rotates the control arm 56 to a gate opening position. The free end portions of the bell crank arms 82 and connected end of the rod 84 are thus positioned upwardly beyond the horizontal center line defined by the pivot pin 78 and the position of the connecting cable 88 where it passes through the aperture defined by the bearings 90 which maintains the bell crank 80 in an off center position until released as hereinafter described.

Since the bell crank arm 100 is pivoted downwardly substantially 90° some means must be provided in connection with the cable 102 to compensate for this pivoting movement away from the arm 101 of the trigger means 28. This is accomplished by connecting the ends of a helical spring 104 to the cable 102 intermediate its ends so that it normally provides a loop or slack portion 102A of predetermined length in the cable. Thus, as shown by dotted lines (FIG. 6), when the bell crank 80 is pivoted to its dotted line position the spring 104 is placed under a greater tension wherein the loop portion 102A of the cable 102 becomes taut. This completes the opening cycle of the gate in one direction.

Referring now to FIG. 3, an upstanding bracket arm 106 is connected to the end portion of the control arm 56 opposite the socket 58 for connection with one end portion of a helical spring 108 which is in turn connected at its other end to the lowermost gate cross bar 20. Thus, when the control arm 56 is pivoted toward its dotted line position (FIGS. 1 and 6) the spring 108 tends to rotate the gate toward an open position as an aid to gravitational attraction for the gate and to accelerate the opening action. If desired the V-shaped wing member 92 may be rigidly connected with the angular arm 94 or bolt 52 with both legs of the member 92 projecting toward the trigger means 26 or 28 so that the gate 10 will open in only one direction.

Referring more particularly to FIG. 7, the gate has been pivoted toward an open position away from the approaching vehicle, as shown by dotted lines (FIG. 1) and shown in solid lines (FIG. 7). When the vehicle passes through the gate the wheels thereof pivot the bar 73 of the trigger means 28 in a clockwise direction, as viewed in FIG. 7, which rotates the associated bell crank arms 83 toward the trigger means 26 which places slack in a cable 89 connecting the bell crank 81 to the other arm of the wing 92 through the conduit 32.

Referring also to FIG. 3, a control arm closing spring 110, connected to the end portion of the control arm 56 opposite the socket 58 and connected at its other end to one end of an outstanding bracket arm 112 projecting toward the latching post and connected, at its other end, with the control housing 40, pivots the control arm 56 to is normal gate closed position. This unbalances the opened gate and starts the gate moving toward a closed position aided by the spring 108. Simultaneously the clockwise rotation of the crank arm 101 of the trigger means 28 rotates the bell crank 80 of the trigger means 26 out of its off center position by means of the cable 102. After the passage of the vehicle the tension of the spring 104 returns the bell crank 81 of the trigger means 28 to its normal gate closed position.

Movement of the vehicle through the gate from the opposite direction, from right to left, as viewed in FIGS. 6 and 7, performs an equal and opposite movement of the above described components thus opening the gate in the other direction.

The latching means 36 is preferably a cam action type and in the example shown comprises a slotted bar 114 adjustably connected to the latching post 14 (FIG. 8). A pair of ears 116 are rigidly connected to the bar 114 and project toward the gate in parallel spaced-apart relation. A pair of wing-like latching members or lugs 118 are pivotally connected, respectively, to the ears 116 for individual vertical pivoting movement. Each of the lugs 118 is provided with an outwardly and upwardly beveled or cam surface 120 so that a latching prong 21, connected with the gate end member 18, may contact the respective surface 120 as the gate is moved to a closed position to lift the respective lug 118 while the opposite lug 118 arrests the latching prong 21. This permits the upwardly cammed lug 118 to return by gravity to its gate latched position. An arcuate strap-like supporting guide 122 is contacted by the gate latching prong 21 when the gate is latched in its closed position. The guide 122 partially supports the mass of the free end portion of the gate when the latter is in closed position.

Referring to FIG. 9, retainer means 124 is provided for arresting the swinging movement of the gate when pivoted toward an open position which comprises a relatively short upstanding support 126 imbedded in the surface of the earth and having a spring steel upwardly bowed or arcuate cam arm 128 secured, at one end, to the upper end portion of the support 126. A socket-like recess 130, formed in the arm 128 adjacent the support 126, nests a portion of the lowermost gate cross bar 20 thus maintaining the gate in open position.

*Operation*

In operation the gate and operating components are installed as described hereinabove. A vehicle approaching one of the trigger means, for example the trigger means 26, pivots the bar 72 toward the gate rotating the control arm 56 and the depending end portion of the gate pivot post 16 toward the trigger means 26, as described hereinabove. Rotating the depending end portion of the gate pivot post 16 toward the trigger means 26 and toward the latched end of the gate thus lifts the gate latching prong 21 upwardly and out of contact with the latching lugs 118 wherein gravitational attraction for the unbalanced condition of the gate 10, aided by the spring 108, swings the gate to an open position, as shown by dotted lines (FIG. 1). Similarly as described hereinabove with respect to FIGS. 6 and 7, when the vehicle pivots the bar 73 of the trigger means 28 away from the gate, the control arm 56 and depending end portion of the gate pivot post 16 are rotated, by the spring 110, back into alignment with the plane of the fence. This lifts the free end portion of the gate out of contact with the gate retainer means 124, if used, and unbalances the gate for gravitational movement, aided by the spring 108, toward its closed position wherein the gate latching prong 21 lifts the adjacent latch lug 118 and is arrested in a latched position by the opposite lug 118 as described hereinabove.

Obviously the invention is susceptible to some change or alteration without defeating its practicability, and I therefore do not wish to be confined to the preferred embodiment shown in the drawings and described herein, further than I am limited by the scope of the appended claims.

I claim:

1. In an automatic gate opening means, the combination with a gate and gate posts, of: upper and lower hinge means mounting one end of said gate to one said gate post for horizontal swinging movement of the gate about an inclined axis; vehicle operated bar means arranged in the roadway on each side of and parallel with the gate, said bar means comprising a horizontally disposed rod-like bar having a normally vertically disposed pivot arm connected to its respective end for normally holding said bar in parallel spaced relation above the surface of the roadway; trigger means normally maintaining the bar means in an upright position; and means operatively connecting said trigger means to said lower hinge means and moving the inclined axis of the gate to a gate opening position when one of the said bar means is pivoted downwardly by the passage of a vehicle.

2. Structures as specified in claim 1 in which said lower hinge means comprises: a control housing; a control bolt extending into said housing in vertical axial alignment with said upper hinge means; a control arm secured intermediate its ends to said control bolt, said control arm having a socket formed on one of its end portions for pivotally supporting the adjacent depending end portion of said gate; a bracket arm connected, at one end, with said control housing and projecting toward the other said gate post; and a spring extending between and connected with the free end of said bracket arm and the other end portion of said control arm normally biasing said control arm toward a gate closed position.

3. Structure as specified in claim 2 in which said trigger means comprises: a housing positioned in the roadway laterally of the respective side of the gate and adjacent one end of the respective said bar means; a pivot pin journaled by said housing and connected with said pivot arm at said one end of the bar means; a laterally extending frame connected with said housing; a frame pin connected with the other said pivot arm and journaled by said frame in axial alignment with said pivot pin; a bell crank within said housing and secured to said pivot pin; and cable and spring means extending between and connected with like arms of said bell cranks for normally maintaining said bar means in an inactivated position.

4. Structure as specified in claim 3 in which the means connecting said trigger means with said lower hinge means comprises: an angular arm secured to the depending end portion of said control bolt within said control housing; a wing member connected with said angular arm; and other cables connecting the respective other arm of said bell cranks with said wing member.

References Cited
UNITED STATES PATENTS

| | | | |
|---|---|---|---|
| 218,235 | 8/1879 | Cottom | 49—241 |
| 609,035 | 8/1898 | Manlove | 49—243 |
| 1,186,738 | 6/1916 | Boudreau | 49—241 |
| 1,226,761 | 5/1917 | Enebo | 49—242 |
| 1,590,102 | 6/1926 | Long | 49—244 |
| 1,655,328 | 1/1928 | Murphy | 49—242 |
| 2,713,736 | 7/1955 | Thomas et al. | 49—242 |

DAVID J. WILLIAMOWSKY, *Primary Examiner.*

DENNIS L. TAYLOR, *Examiner.*